United States Patent [19]
Sethuram et al.

[11] Patent Number: 5,828,903
[45] Date of Patent: Oct. 27, 1998

[54] SYSTEM FOR PERFORMING DMA TRANSFER WITH A PIPELINE CONTROL SWITCHING SUCH THAT THE FIRST STORAGE AREA CONTAINS LOCATION OF A BUFFER FOR SUBSEQUENT TRANSFER

[75] Inventors: Jay Sethuram, Saratoga; Haim Sadger, Sunnyvale, both of Calif.; Kevin C. Kahn, Portland, Oreg.; Farhad Mighani, San Jose, Calif.

[73] Assignee: Intel Corporation, Santa Clara, Calif.

[21] Appl. No.: 751,340

[22] Filed: Nov. 19, 1996

Related U.S. Application Data

[63] Continuation of Ser. No. 315,878, Sep. 30, 1994, abandoned.
[51] Int. Cl.$^6$ ................................................. G06F 13/00
[52] U.S. Cl. ..................... 395/817; 395/842; 395/200.42
[58] Field of Search ........................... 370/389, 397; 395/200.2, 412, 200.1, 842; 364/242.3, 239.7

[56] References Cited

U.S. PATENT DOCUMENTS

| | | | |
|---|---|---|---|
| 4,750,107 | 6/1988 | Buggert | 395/841 |
| 4,881,167 | 11/1989 | Sasaki et al. | 395/411 |
| 5,103,446 | 4/1992 | Fischer | 370/85.1 |
| 5,136,584 | 8/1992 | Hedlund | 370/94.1 |
| 5,182,800 | 1/1993 | Farrell et al. | 395/425 |
| 5,208,915 | 5/1993 | Stadlmeier et al. | 395/325 |
| 5,210,749 | 5/1993 | Firoozmand | 370/85.1 |
| 5,274,768 | 12/1993 | Traw et al. | 395/275 |
| 5,299,313 | 3/1994 | Petersen et al. | 395/200 |
| 5,301,287 | 4/1994 | Herrell et al. | 395/400 |
| 5,315,708 | 5/1994 | Eidler et al. | 395/250 |
| 5,347,634 | 9/1994 | Herrell et al. | 395/250 |
| 5,379,297 | 1/1995 | Glover et al. | 370/60.1 |
| 5,420,984 | 5/1995 | Good et al. | 395/275 |
| 5,444,853 | 8/1995 | Lentz | 395/250 |
| 5,446,726 | 8/1995 | Rostoker et al. | 370/17 |
| 5,448,558 | 9/1995 | Gildea et al. | 370/60 |
| 5,448,702 | 9/1995 | Garcia, Jr. et al. | 395/325 |
| 5,459,843 | 10/1995 | Davis et al. | 395/375 |
| 5,522,045 | 5/1996 | Sandberg | 395/200.08 |

*Primary Examiner*—Thomas C. Lee
*Assistant Examiner*—Anderson I. Chen
*Attorney, Agent, or Firm*—Blakely, Sokoloff, Taylor & Zafman

[57] ABSTRACT

The present invention teaches a new system for transferring data between a network and hosts coupled to the network. The system uses an adapter, that is coupled between the host and the network, to allow segmenting and reassembling cells directly in the host memory. The present invention also teaches a pipelined DMA architecture to overcome the problem of the interruption of the DMA operation when switching from one virtual circuit to the next. This architecture depends on fast access to a local memory used for storing buffer descriptors for each virtual circuit. In this architecture, a two stage pipeline is used with the first stage performing the local memory access while the second stage performs the DMA transfers. When the pipeline is filled, both stages will operate in parallel yielding significant gain in performance due to continuous operation of the DMA.

49 Claims, 9 Drawing Sheets

SYSTEM FOR PERFORMING DMA TRANSFER WITH A PIPELINE CONTROL SWITCHING SUCH THAT THE FIRST STORAGE AREA CONTAINS LOCATION OF A BUFFER FOR SUBSEQUENT TRANSFER

This is a continuation of application Ser. No. 08/315,878, filed Sep. 30, 1994, now abandoned.

BACKGROUND OF THE INVENTION

1. Field of the Invention

The present invention relates generally to the field of computer networks. More particularly, the present invention relates to the field of asynchronous transfer mode (ATM) networks.

2. Description of the Related Art

Asynchronous transfer mode (ATM) networks have become increasingly popular for sending information at very high speeds between a transmission point and one or more receiving points. One advantage of an ATM network is that the timing of transmissions is not dependent on the timing of other processes or transmissions occurring in the network. In an ATM network, a plurality of virtual circuits are established over a single physical connection. A virtual circuit is a connection between two points, such as host devices that are connected to the network. Data transferred between each pair of host devices are transferred on a particular virtual circuit. Typically, data are transferred over the ATM network using short bursts of 53 byte cells. Each cell consists of 5 header bytes and 48 data bytes. The data stream over the ATM network sent to a particular host device may consist of intermixed cells belonging to several virtual circuits. A receiver at the host device assembles these cells separately depending on which virtual circuit the incoming cell belongs to. Conversely, a transmitter segments the data to be sent across one or more virtual circuits into cells and transmits them according to a prespecified order in a single stream. Thus cells destined to a particular host device are sent along a particular virtual circuit. The process of segmentation and reassembly of cells is called SAR.

FIG. 1 illustrates a number of host devices, host device A 100, host device B 101, host device C 102, and host device D 103 coupled to an ATM network via a network switch 104. Each pair of host devices, e.g., host device A 100 and host device B 101, or host device B 101 and host device C 102, is connected via a virtual circuit. Since there is one physical connection between each host device and the network and a host device is generally coupled to more than one other host device on the network, a physical circuit may be used by more than one virtual circuit. For example, the physical circuit 105 between the network switch 104 and host device A 100 is shared by all the virtual circuits coupled to host device A 100.

The ATM virtual circuit configuration is quite different from other network configurations in which an exclusive point to point connection is established between the receiver and transmitter before transmitting. Current standards specify rates over the ATM network ranging from 25 Mbits to 2.4 Gigabits/second. At the higher data rates, particularly 155 Mbits or greater, an efficient mechanism is required to transfer data over multiple virtual circuits between a host device and the network. Standard network mechanisms will not work efficiently for ATM applications because an ATM data stream may contain intermixed cells belonging to several different virtual circuits. The intermixed stream of cells introduces delays in the receive or transmit process as the receiving or transmitting device must process data from different virtual circuits separately. Such delays can not be tolerated at the higher speeds an ATM network can operate.

BRIEF SUMMARY OF THE INVENTION

It is an object of the present invention to provide a system and a method for segmenting and assembling cells transmitted on a network directly in the host memory.

It is also an object of the present invention to provide a pipelined direct memory access (DMA) architecture in order to efficiently transfer data at the high data transmission rates at which an asynchronous transfer mode (ATM) network operates.

In order to accomplish these and other objectives a system is proposed for segmenting and reassembling cells directly in the host memory. The system uses an adapter coupled between a host device, such as a computer system, and a network. The adapter includes an adapter local memory and a direct memory access (DMA) engine coupled to the host memory and performs DMA transfers between the adapter and host memory.

Virtual registers (VRs) are established in the adapter local memory to identify the location of buffers in the host memory used to store data transferred to and from the network. The DMA engine references the VRs in the adapter local memory to determine the host memory locations to access to perform the segmentation and reassembly of cells (SAR). Therefore, when a cell is received over the network, the virtual circuit is identified from the cell header information, the virtual register corresponding to the virtual circuit is accessed and the data is written by the DMA controller directly into the host memory. When data is to be transmitted, the host device writes the data into the host memory in the buffer identified for a specified virtual circuit and the adapter is notified of the data to be transmitted. The adapter responds by directly accessing the buffer in the host memory to extract the data for a cell, adding cell header information corresponding to the identified virtual circuit and transmitting the cell out on the network.

In one embodiment, the system also provides transmission buffers in the host memory in which the data is segmented into cells to be transmitted. The system of the present invention also provides a pipelined DMA architecture for transmitting and receiving cells. A two stage pipeline and two physical register banks are utilized to accomplish parallelism. Stage 1 of the pipeline performs a virtual register access to ascertain the address in the host memory at which the DMA operation is to take place for the next incoming cell while stage 2 performs DMA transfers for the present cell. Each time the virtual circuit is switched, the physical register banks belonging to stage one and stage two are switched so as to avoid delays which result when interrupting the transfer process to read the virtual registers.

Other objects, features, and advantages of the present invention will be apparent from the accompanying drawings and from the detailed description that follows below.

BRIEF DESCRIPTION OF THE DRAWINGS

The objects, features and advantages of the present invention will be apparent from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical circuits and structures are shown in block diagram form in order not to obscure the present invention unnecessarily.

The system and method of the present invention is described in terms of an asynchronous transfer mode (ATM) networks. However, it is apparent to one skilled in the art that the present invention is not limited as such and can be applied to other communication devices which use data packets, including a variety of types of data, for example isochronous data, transmitted at a high frequency.

Figure 1:
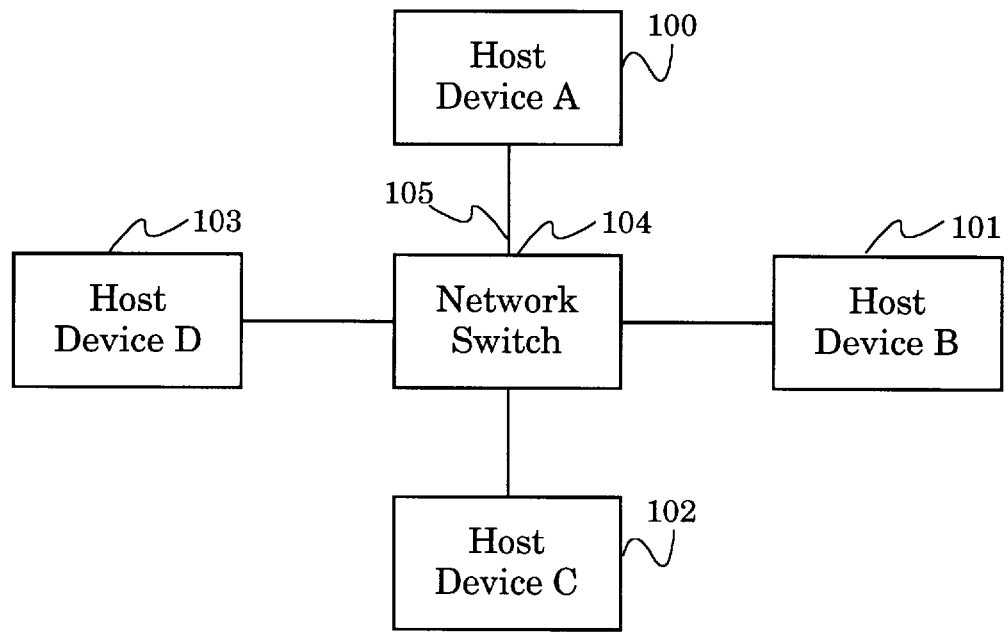
FIG. 1 illustrates a network and a number of host devices coupled to the network.
Figure 2A:
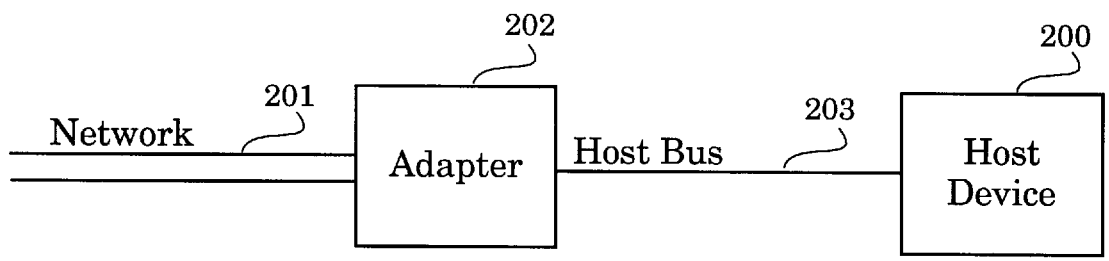
FIG. 2a illustrates an adapter coupled between a host device and the network in accordance with the teachings of the present invention.
Figure 2B:
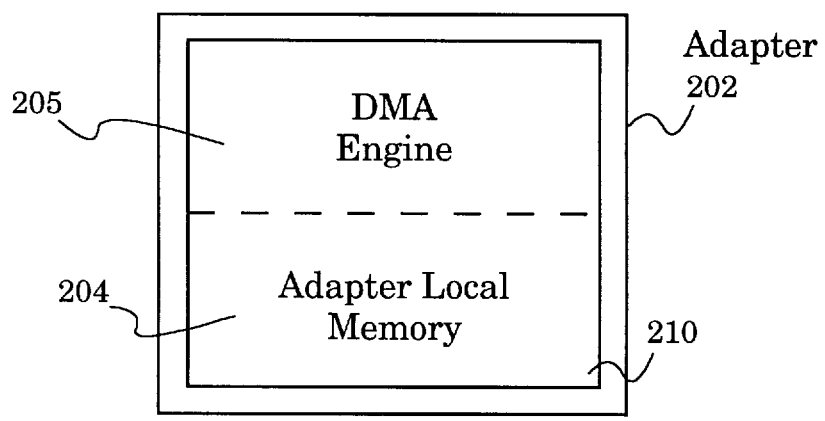
FIG. 2b illustrates one embodiment of the adapter.
Figure 2C:
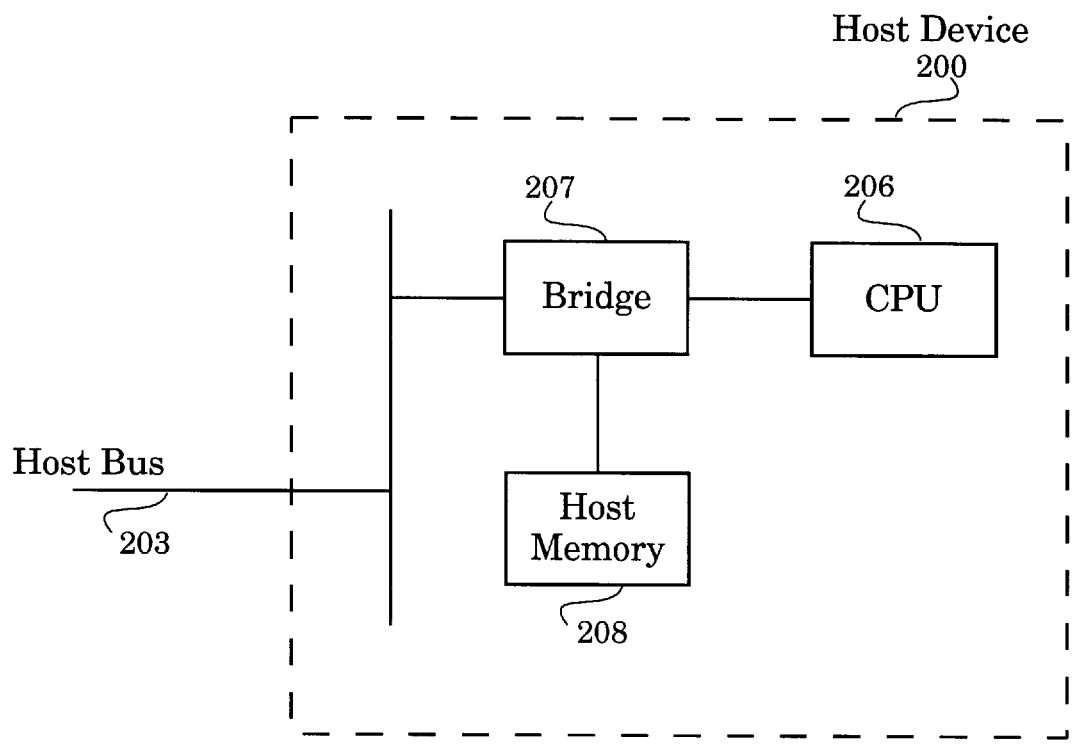
FIG. 2c illustrates an embodiment of a host device which connects to the adapter.

An example of the connections between the network and a host device is illustrated by FIG. 2a. Referring to FIG. 2a, a host device 200 is coupled to a network 201 through an adapter 202. The host device 200 is coupled to the adapter 202 through a host bus 203. Referring to FIG. 2b, the adapter 202 of the claimed invention includes an adapter local memory 204 and a direct memory access (DMA) engine 205 coupled to the adapter local memory 204. The DMA engine functions to manage the adapter local memory in accordance with teachings herein and perform DMA transfers between the network and host memory. The DMA engine may be a microprocessor, a microcontroller, state machine or the like. FIG. 2c provides an exemplary illustration of a host device. It is readily apparent to one skilled in the art that the host device can be any of a number of types of devices, including servers, microprocessor-driven devices and the like. Furthermore, the architecture of the host device is exemplary and many types of architectures can be utilized. In the present illustration, the host device 200 includes a CPU 206 coupled to a bridge 207 which provides memory control for the host memory 208. The host memory 208, which provides a plurality of buffers for storing data, is coupled to the bridge 207.

In accordance with the teachings of the present invention, the adapter 202 controls the transfer of data between the host device 200 and the network 201 such that incoming cells are assembled directly in the host memory 208. Each incoming cell includes a header, which includes a field that identifies the virtual circuit associated with the given cell, and data, which contains the information intended for transmittal. For each incoming cell, the adapter 202 reads the header information and determines the appropriate buffer in the host memory 208 to send the cell data. Thus the incoming data is assembled directly in the host memory 208.

To transmit data, the host device 200 writes the data to be transmitted into the buffers in the host memory 208. The adapter 202 transmits the data in these buffers as 53 byte cells by retrieving small portions or segments of data directly from the host memory 208. Thus, in one embodiment, the transmit process involves the following steps: (1) the host device 200 prepares the buffers for transmission by writing data into the buffers, (2) the host device 200 informs the adapter 202 of the existence of these buffers, (3) the adapter 202 retrieves the data from the buffers in 48 byte segments and adds the five bytes of header information to form a 53 byte cell, (4) the adapter 202 transmits the cells to the network, and (5) the adapter 202 notifies the host device 200 of transmission completion.

Figure 3A:
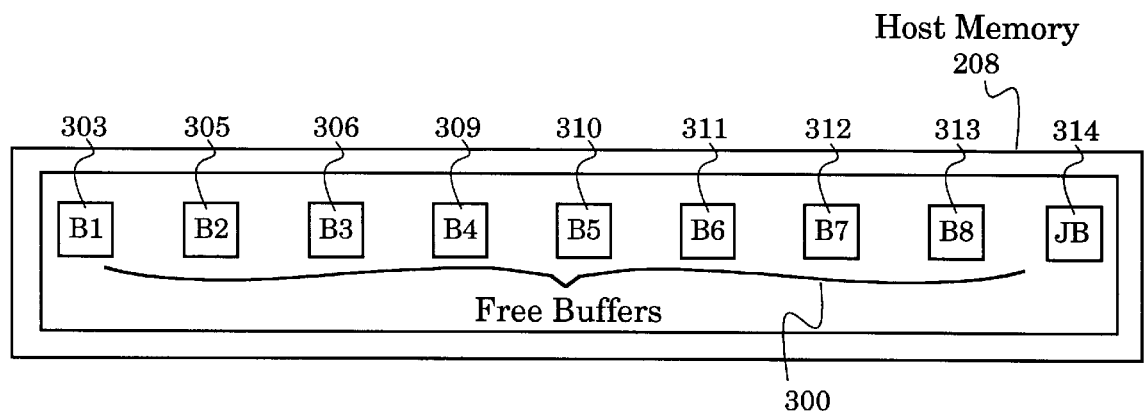
FIG. 3a illustrates the memory organization of the host device for a data receive process in accordance with the teachings of the present invention.
Figure 3B:
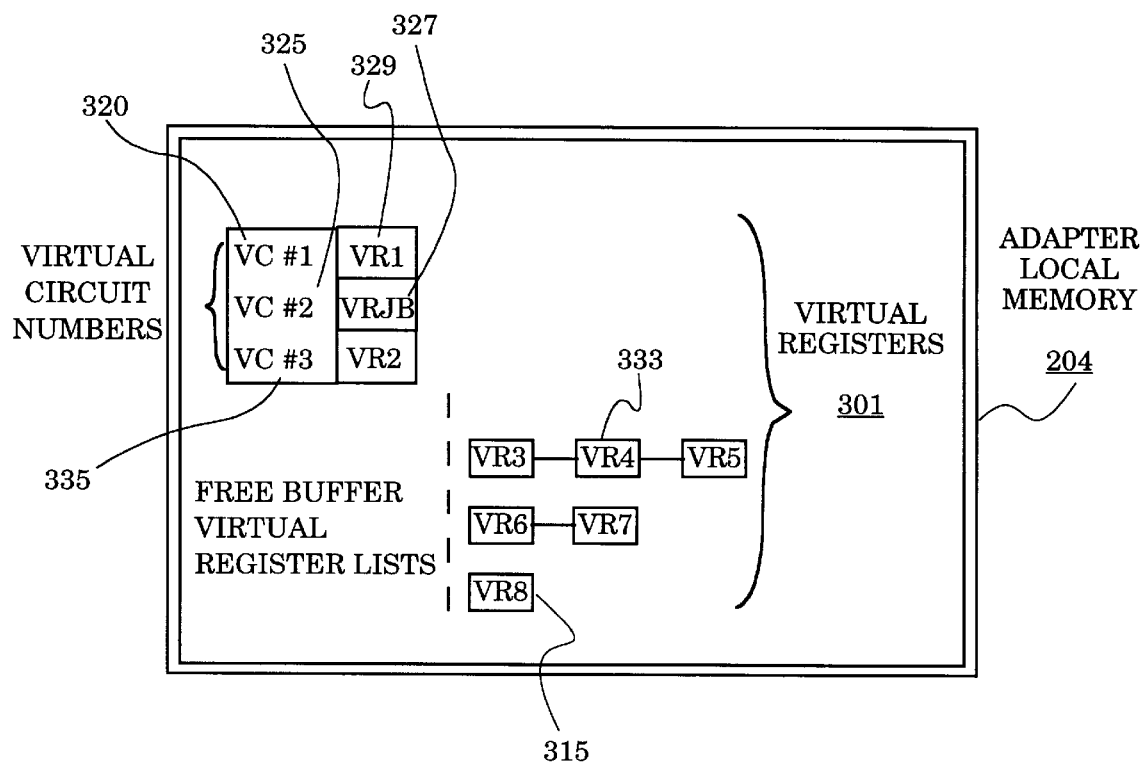
FIG. 3b illustrates the memory organization of an adapter for a data receive process in accordance with the teachings of the present invention.

In an alternate embodiment, the host device forms the 53 byte cell (including header information) and writes the data into the buffer for transmission. The adapter is notified of the data and responds by retrieving the 53 bytes and transmitting the cells out to the network. FIGS. 3a and 3b are exemplary illustrations of the memory structure of the host memory 208 and the adapter local memory 204 to support the receive process. Preferably, during initialization, the host device sets up free buffers 300 in the host memory 208 and creates corresponding virtual registers 301, which are also known as buffer descriptors, in the adapter local memory 204. At initialization, virtual registers 315 are identified as free. Preferably, the list of free virtual registers is maintained in a linked list, also referred to herein as a "free buffer chain", for quick access. Although in the present embodiment the buffers and corresponding virtual registers are created at initialization, it is readily apparent that the buffers and virtual registers could be created during system operation on an "as needed" basis.

In one embodiment, a separate buffer is allocated for all virtual circuits which have not yet been established. Referring to FIG. 3b, virtual circuit VC#2 325 points to a junk buffer 327. Data arriving on unestablished virtual circuits, e.g., VC#2 325, are written into the junk buffer 314 so as not to interfere with data arriving on established virtual circuits. When a virtual circuit is established but data has not yet arrived on that virtual circuit, such as VC#3 335 in FIG. 3b, then no buffer is initially assigned to the virtual circuit. When data arrives on a virtual circuit, the DMA engine removes a VR, for example VR#2 333, from the head of one of the free buffer chains and assigns it to the virtual circuit. Once a virtual register is assigned to a virtual circuit then incoming cells arriving on that virtual circuit, i.e. incoming cells with a virtual circuit number corresponding to the virtual circuit assigned to virtual register are directly transferred to the buffers in host memory. The DMA engine uses the incoming virtual circuit number identified with incoming data to access the virtual register (VR) that contains the address of the corresponding buffer in host memory. For example, if the incoming virtual circuit number is VC#1, the address of buffer B1 303 is fetched from virtual register VR1 329 and the data from the incoming cells transmitted on VC

1 are reassembled in buffer B1 303. In one embodiment, the header information of the incoming cell is discarded after being read and the data of the cell is directly transferred to the buffer in the host memory that corresponds to the assigned virtual register. In another embodiment, the cell, including header information, is transferred directly to the buffer. Therefore, data arriving on virtual circuit is directly transferred to buffer B1 303.

The DMA engine also manages the virtual registers 301. Whenever the current buffer for a virtual circuit is filled, the DMA engine removes the VR assigned to the virtual circuit and notifies the host device. Preferably the communications between the DMA engine and the host device are achieved via a mailbox facility, which is described in detail below. The DMA engine also relinks a new VR from the head the appropriate free buffer chain to the virtual circuit. For example, the open virtual circuit VC1 corresponds to the virtual register for buffers B1 303, while virtual registers VR3 to VR8 for buffers B3 through B8 are linked in free buffer virtual register lists. These free buffer virtual registers are assigned to virtual circuits when the current buffers corresponding to the virtual circuits are filled or data arrives on a new virtual circuit. Preferably, the free buffer lists are organized according to size and the buffers are utilized accordingly to the size of PDU or other size requirements. For example, B3 308, B4 309 and B5 310 are buffers of a first size, B6 311 and B7 312 are buffers of a second size, and B8 313 is a buffer of a third size.

Figure 4:
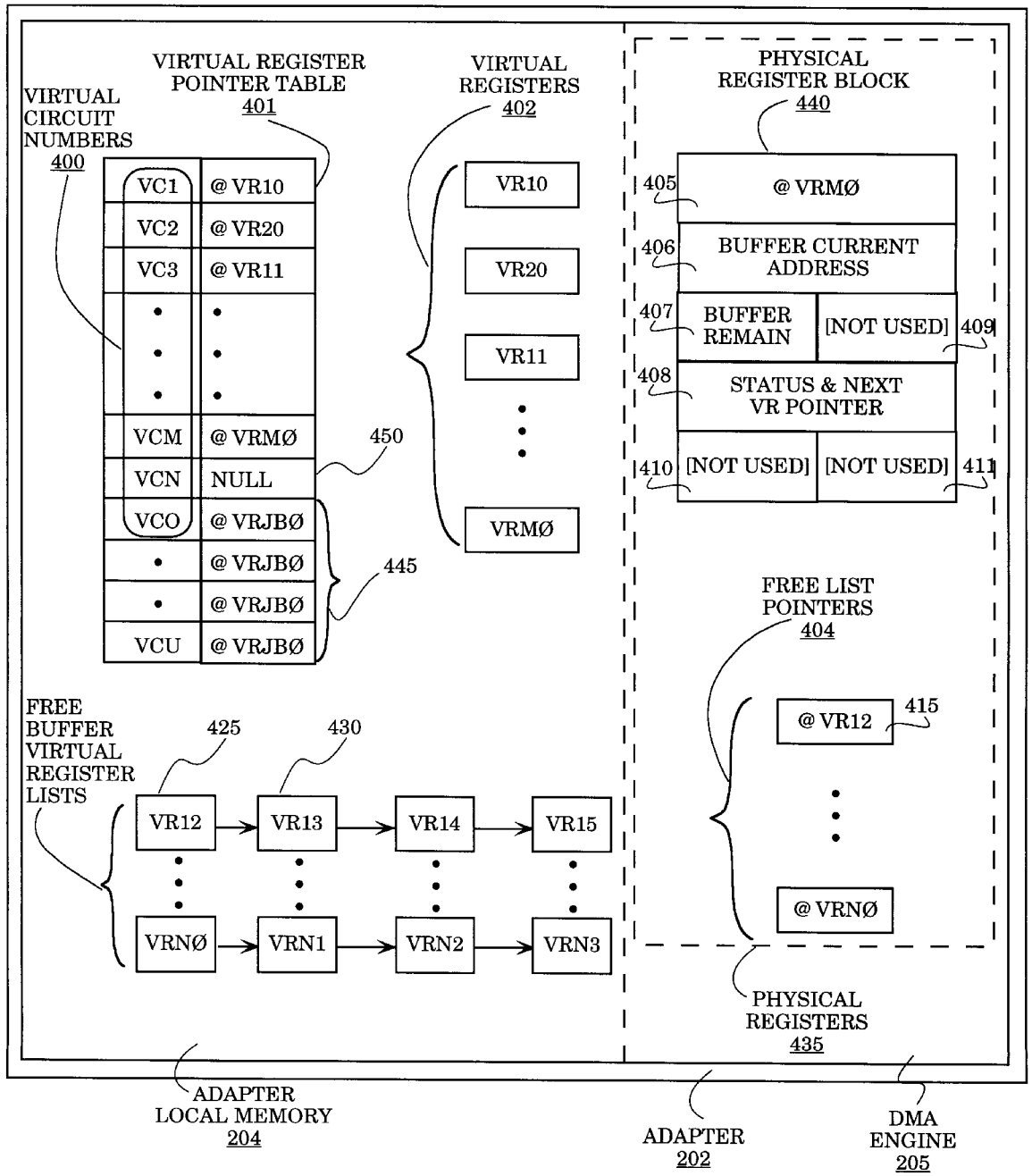
FIG. 4 illustrates one embodiment of the adapter local memory structure and one embodiment of the DMA engine memory structure for the receive process.

FIGS. 4 illustrates an example of the adapter local memory 204 structure and the DMA engine 205 memory structure for the receive process. In this embodiment, the adapter local memory 204 contains the virtual register pointer table 401 which provides an identification 400 of each virtual circuit and a pointer 420 which points to the corresponding virtual register 402. In the present example, each entry in the table of virtual registers 401 contains a pointer 420 to the virtual registers 402 located in the adapter local memory 204 containing buffer control information used by the DMA engine 205.

Preferably, the virtual register pointer table contains entries for all possible virtual circuits even though virtual registers and buffers have not yet been assigned to the virtual circuit. Thus, those virtual circuits that have not yet been established, for example virtual circuits VCO–VCU 445 have a pointer to a virtual register that points to a junk buffer. This provides erroneous transfers to the adapter on unestablished virtual circuits to be safely written to the junk buffer without corrupting data in other buffers. Once a virtual circuit is established but data has not yet been transferred, the pointer value is set a null value. For example, virtual circuit VCN has been established and therefore the pointer 450 is set to a null value. Subsequently, when the first data arrives on the established virtual circuit, the adapter assigns a virtual register and buffer, using the list of free buffers 414, and updates the pointer 450 to point to the virtual register assigned. When the virtual circuit is subsequently closed, the pointer is again set to point to the virtual register that points to the junk buffer.

When a data receive operation occurs, the corresponding virtual register pointer for the virtual circuit VR 402 is copied into a physical register block 440 in the DMA engine 205. The physical register block 440 may consist of one or more physical registers. This information copied into the physical register block 440 includes the virtual register pointer 405, the buffer current address 406, the amount of buffer space remaining 407, the status information and the next VR pointer 408 for multiple buffer receive processes. In the present illustration, certain parts of the physical register block 440, such as the parts labeled 409, 410, and 410 are not used. However, it is readily apparent that different applications may require additional information which may be located in portions 409, 410, and 411.

The adapter local memory 204 preferably maintains a free virtual register list, although this can also be maintained in the host memory. In this embodiment, the free registers are grouped according to buffer size. Therefore, separate lists of free virtual registers are maintained for each buffer size. Referring to FIG. 4, the entries in free list pointers 404 point to the first virtual register in the free linked list of virtual registers 414 for each buffer size. The pointer, e.g., pointer 415, points to the head of the free list 425 which points to the virtual register of a corresponding free buffer in the host memory. Once the virtual register is allocated to a virtual circuit, the entry 425 is removed from the free linked list of virtual registers 414, thus placing the next entry 430 at the head of the list 414 and updating the free list pointers 404 and the virtual register pointer table 401 to reflect the next entry 430.

In the present embodiment, the DMA engine 205 includes physical register block 440 which is accessed by the DMA engine to perform DMA transfers between the adapter and the buffers located in the host memory. It is readily apparent that the details of the data structure provided above are exemplary and other structures can be utilized in the system and method described to enable efficient transmission and reception of data across an ATM network.

Continuing with the present example, during the receive process the adapter 202 performs the following steps for each virtual circuit:

1. Load the virtual register 402 for an incoming virtual circuit into physical register block 440 in the DMA engine 205, which requires the following steps:
   a. Extracting the virtual circuit number for an incoming cell;
   b. Using the virtual circuit number as an index to the virtual register pointer table 401 to obtain the pointer 420 to the corresponding virtual register 402; and
   c. copying the virtual register 402 into the physical register block 440 in the DMA engine 205.

2. Initiate the DMA transfer, wherein the data in the incoming cells is directly transferred to the appropriate buffer in the host memory identified by the virtual register.

3. Once the receipt of transmission is complete or a call for another virtual circuit is received, update the virtual registers 402 by writing back the content of the physical register block 440.

4. Notify the host device:
   a. If the buffer becomes full during the receive process; and
   b. after completion of the transfer of an entire packet data unit (PDU) or frame indicating completion of receive of a current transmission.

The DMA engine 205 modifies the content of the physical register block 440 during the DMA transfers according to the DMA activity which occurred during the transfer. Thus, during DMA transfers, it is preferred that the modified physical register block 440 be written back into the virtual registers 402 in the adapter local memory 204 if the data in the buffer is not entirely transferred out of the buffer by the host device during the transmit process or if the buffer is not entirely filled up during the receive process before the DMA engine 205 proceeds with another DMA transfer for a different virtual circuit. This insures that the next time the buffer is accessed, the data transfer occurs at the proper buffer location.

Figure 5:
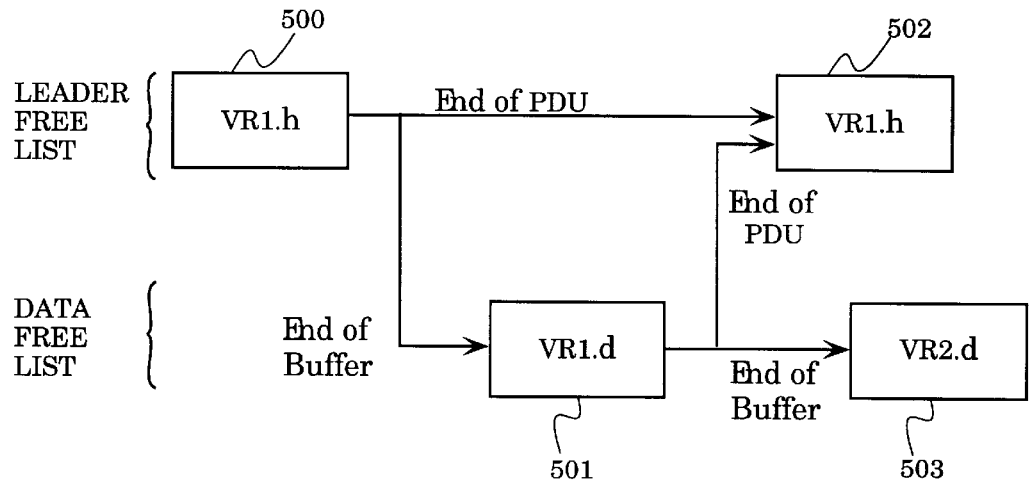
FIG. 5 illustrates the header/data splitting process used in one embodiment of the present invention.

FIG. 5 is an exemplary illustration of the process for splitting the header and the data of incoming packet data units (PDUs). A PDU typically comprises a multiplicity of cells. In this process, the header information of incoming PDUs are reassembled in header buffers and the data of incoming PDUs are reassembled in data buffers. The size of the header buffers correspond to the size of a PDU header such that when the end of the header buffer is reached, the next data received is the data of the PDU. Preferably the size of the header buffer is increased to store a small predetermined amount of data, such as one byte, to permit the header buffer to accept a small PDU having a single piece of information such as a character. The process of header and data splitting begins by filling the header buffer pointed to by VR 1.h 500 with the incoming cells. While filling the buffer pointed to by VR 1.h 500, if the end of the buffer is reached, then the incoming cells are reassembled in the data buffer pointed to by VR 1.d 501. But, on the other hand if the end of the PDU is reached when filling the buffer pointed to by VR 1.h 500, then the incoming cells are reassembled in the buffer pointed to by VR 2.h 502 because the PDU contained only a small portion of data such as a byte or word which may be representative of a single character.

While reassembling data in the buffer pointed to by VR 1.d 501, if the end of the buffer is reached, then the reassembly of the data is continued in the next data buffer pointed to by VR 2.d 503. However, if the end of the PDU is reached while filling the buffer pointed to by VR 1.d 501, then the reassembly of the next incoming cell starts in the buffer pointed to by VR 2.h 502. This process continues in the same general manner described above for other header and data buffers (not shown) so long as cells continue to be received from the network. The process described above allows sending the header of the incoming PDU's to certain buffers in the host memory, while the data of the incoming PDU's is sent to another set of buffers in the host memory. This process performs the necessary separation of header and data information while avoiding making a copy of the incoming data.

Figure 6A:
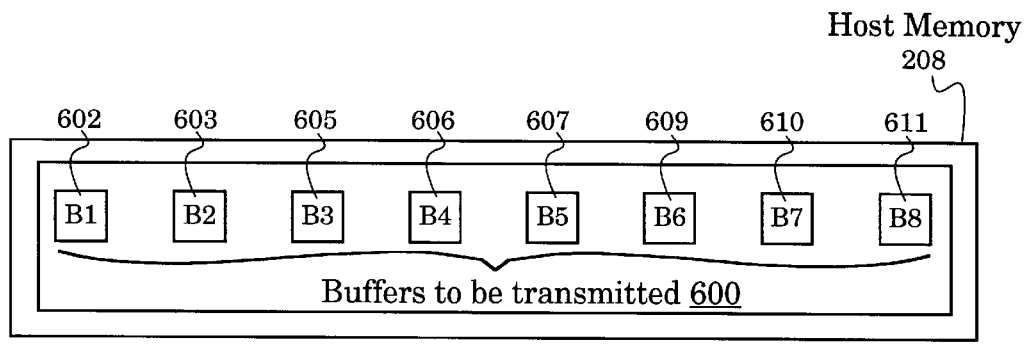
FIG. 6a illustrates the memory organization of an adapter for the transmit process.
Figure 6B:
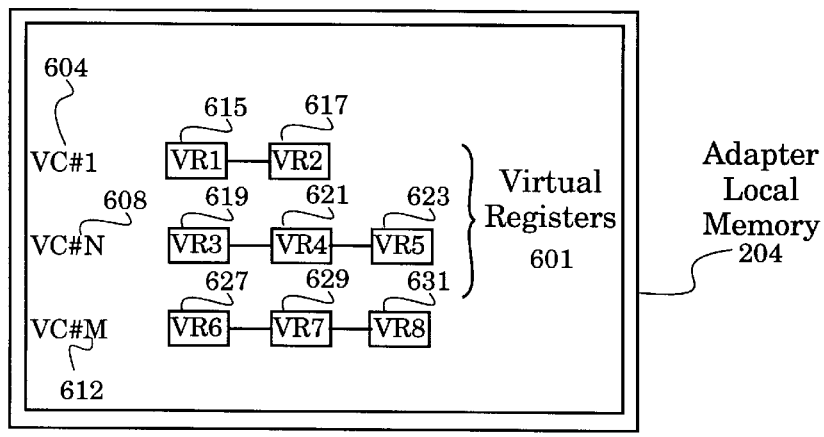
FIG. 6b illustrates the memory organization of a host for the transmit process.

FIGS. 6a and 6b are exemplary illustrations of the data structures initialized in the host memory 208 and the adapter local memory 204 for the transmit process. The host device sets up the buffers 600 in the host memory to be transmitted and prepares the corresponding virtual registers 601 in the adapter local memory 204. As is shown in FIG. 6a, buffers B1 to B8 600 represent the buffers in the host memory 208 that store data to be transmitted to the network. The virtual registers VR1 to VR8 601 corresponding to buffers B1 to B8 600 are stored in the adapter local memory 204. The virtual registers 601 for each virtual circuit are chained together by the host device by maintenance of a linked list or an alternate data structure. Thus the virtual registers VR1 615 and VR2 617 for buffers B1 602 and B2 603 are linked together because the data stored in buffers B1 602 and B2 603 are to be transmitted on virtual circuit #1 604. Likewise, the virtual registers VR3 619, VR4 621 and VR5 623 for buffers B3 605, B4 606, and B5 607 are chained together for virtual circuit #N 608, and the virtual registers VR6 627, VR7 629 and VR8 631 for buffers B6 609, B7 610, and B8 611 are chained together for virtual circuit #M 612. The adapter, without the intervention of the host device, retrieves the data directly from the host memory. In one embodiment, the adapter retrieves the data in small segments, for example 48 byte segments, contained in the buffer. The adapter adds a cell header to the retrieved data and transmits the cell comprising the data and cell header on the appropriate virtual circuit until the end of the chain is reached. In an alternate embodiment in which the host stores cell data including header information in the buffer, the adapter retrieves the cell data and transmits the cell data on the appropriate virtual circuit. During runtime, as new buffers are prepared for transmission, the host device creates virtual registers in the adapter local memory 204 for these buffers and adds them to the tail of the appropriate VR chain.

Figure 7:
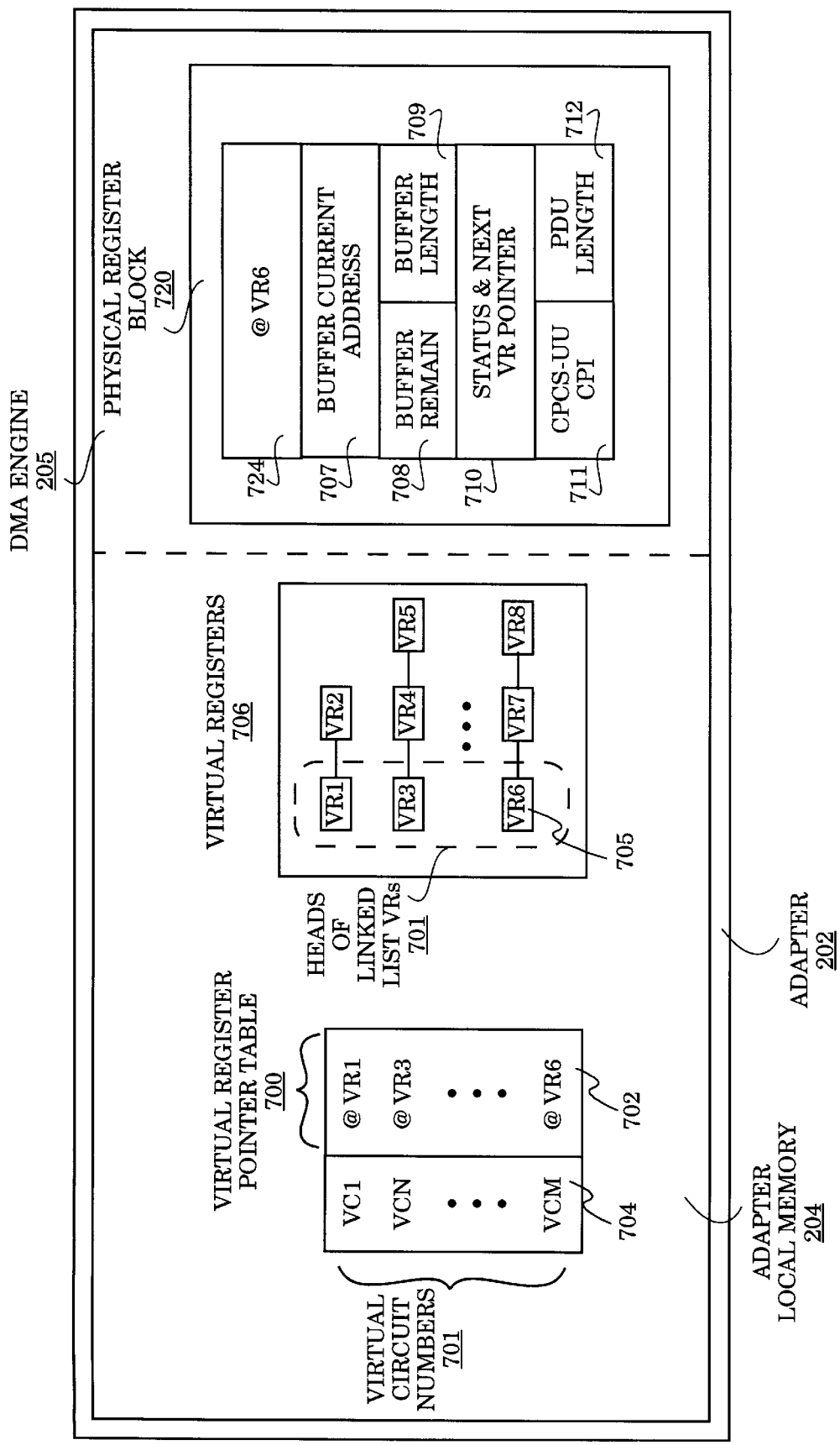
FIG. 7 illustrates one embodiment of the adapter memory structure and one embodiment of the DMA engine memory structure for the transmit process.

FIGS. 7 is an exemplary illustrations of the adapter local memory 204 structure and the DMA engine 205 memory structure for the transmit process. Similar to the receive case, a virtual register pointer table 700 is indexed by the virtual circuit numbers 701, and is initialized by the host device with pointers 702 to the first entries (heads) of the linked lists of virtual registers 703 for each virtual circuit. For example, for virtual circuit M 704, the virtual register pointer table 700 points to the virtual register M.1 705, which is the first entry in the linked list of virtual registers for virtual circuit M 704. The DMA engine 205 indexes into this table 700 using the virtual circuit #s 701 to retrieve the pointers 702 to the first virtual registers 703 in the linked lists of virtual registers 706. Using the pointers 702, the DMA engine 205 copies the corresponding virtual register 703 into physical register block 720 and begins the DMA transfer of the data contained in the host buffer for transmission using the information in the physical register block 720.

Each virtual register used for the transmit process contains information which is similar to that contained by virtual registers used for the receive process. In the present illustration, this information, which is copied into the physical register block 720, includes the pointer to the virtual register 724, the buffer current address 707, the amount of buffer space remaining 708, the buffer length 709, status information and the next VR pointer 710, the common part of convergence sublayer user to user indicator and the common part indicator (CPCS-UU CPI) 711, and the length of the PDU 712.

In the present illustration, during the transmission process, the DMA engine 205 performs the following steps for each virtual circuit:

1. Load the virtual register 706 for the outgoing virtual circuit into the physical register block 720 of the DMA engine 205, which requires the following steps:

a. Extracting the virtual circuit value 701 for the outgoing cell;

b. Using the virtual circuit value 701 as an index to the VR pointer table 700 to obtain the pointer 702 to the current virtual register 706; and c. Copying the virtual register 706 into the physical register block 720.

2. Initiate the DMA transfer to send the outgoing cells out to the network in accordance with the information located in the physical register block 720.

3. Update the virtual register 706 by writing back the contents of physical register block 720 at the end of the DMA transfer.

4. Notify the host in case of the following:

a. If the buffer becomes empty during transmit; and b. After completing the transfer of an entire PDU or frame.

As noted above, the DMA engine 205 modifies the virtual register data during the performance of a DMA transfer. Thus, during DMA transfers, the modified virtual register data must be written from the physical register block back into the virtual register 706 if the contents of the buffer are not entirely transferred out on the network before the transfer of data on another virtual circuit. This insures that the next time the buffer is accessed, the transfer begins at the proper buffer location. This mechanism enables virtual circuits to be interleaved on a cell-by-cell basis during transmit and receive operations, which is necessary in ATM networks.

As noted earlier, in the present embodiment communications between the DMA engine and the host device are achieved through the use of a "mailbox".

Figure 8A:
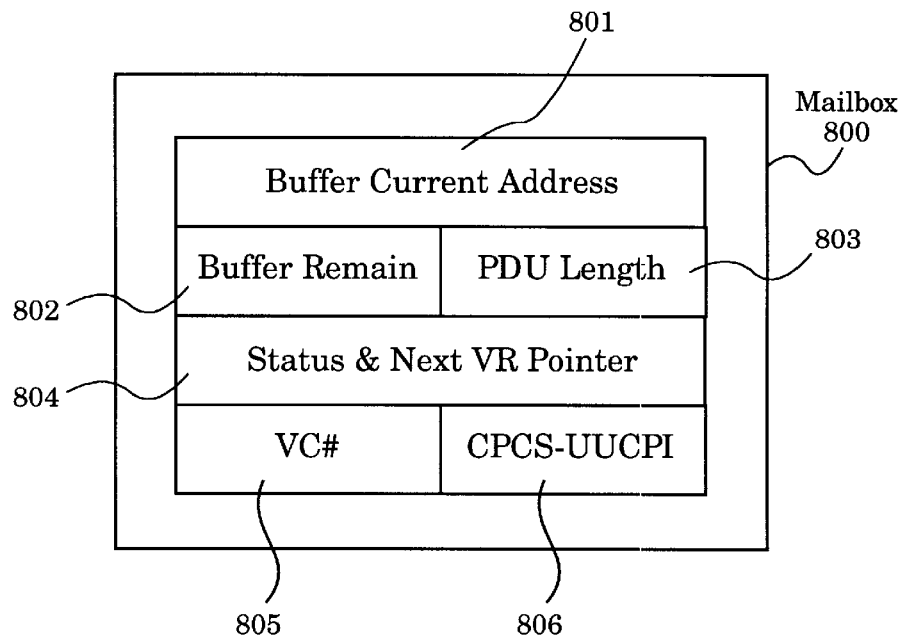
FIG. 8a and 8b illustrates communications between the adapter and a host device.
Figure 8B:
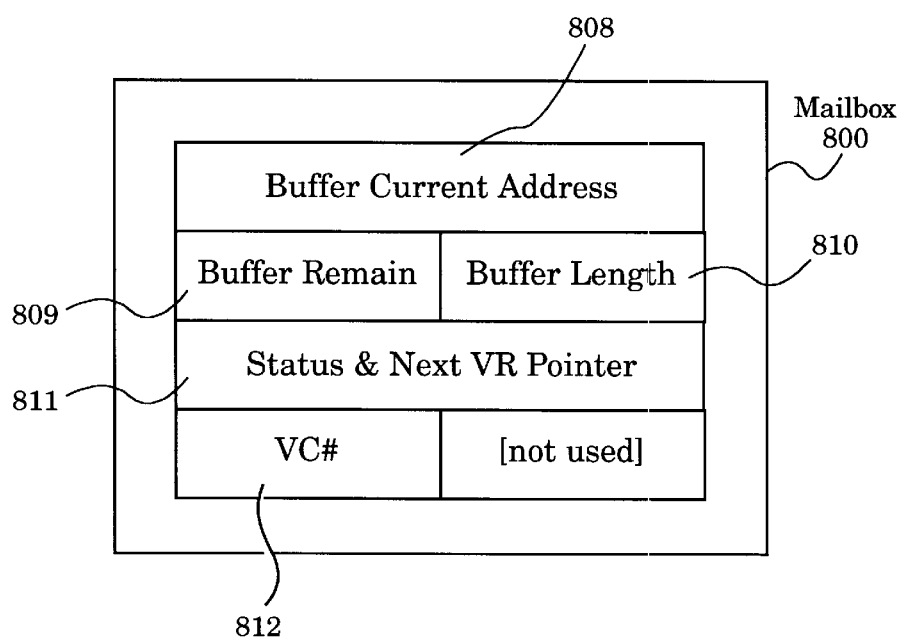

FIGS. 8a and 8b are exemplary illustrations of the receive and transmit message formats utilized. The DMA posts a message regarding the receive or transmit process in the mailbox that can be accessed by the host device. Preferably, the mailbox is a predetermined location in the adapter local memory, although it is readily apparent that the mailbox can be located in the host memory. The host device preferably either periodically polls a mailbox flag, which is set when a message is placed in the mailbox, to check for new messages posted by the DMA engine. Alternatively, the host device is interrupted by the DMA engine to notify the host device that a message has been posted in the mailbox. During the receive process, after completing the reassembly of a buffer, either at the end of a buffer or PDU, the DMA engine posts the virtual circuit # and the virtual register corresponding to the reassembled buffer in the mailbox 800 that can be accessed by the host device. Messages posted in the mailbox during the receive process include much of the same information contained in a virtual register. For example, referring to FIG. 8a, the message includes the buffer current address 801, the amount of buffer space remaining 802, the corresponding packet data unit (PDU) length 803, status information and next VR pointer 804. The message also includes the virtual circuit # (VC #) 805, the common part of convergence sublayer user to user indicator and the common part indicator (CPCS-UU CPI) 806.

Likewise, during the transmit process, after transmitting a complete PDU or at the end of each buffer, the DMA engine posts a message containing the virtual circuit number and much of the same information contained in the virtual register, corresponding to the buffer that has been transmitted, in a mailbox 800, which can be accessed by the host device. A message regarding the transmit process contains the following information: the buffer current address 808, the amount of buffer remaining 809, the buffer length 810, status and the next VR pointer 811, and the virtual circuit # (VC #) 812.

Figure 9A:
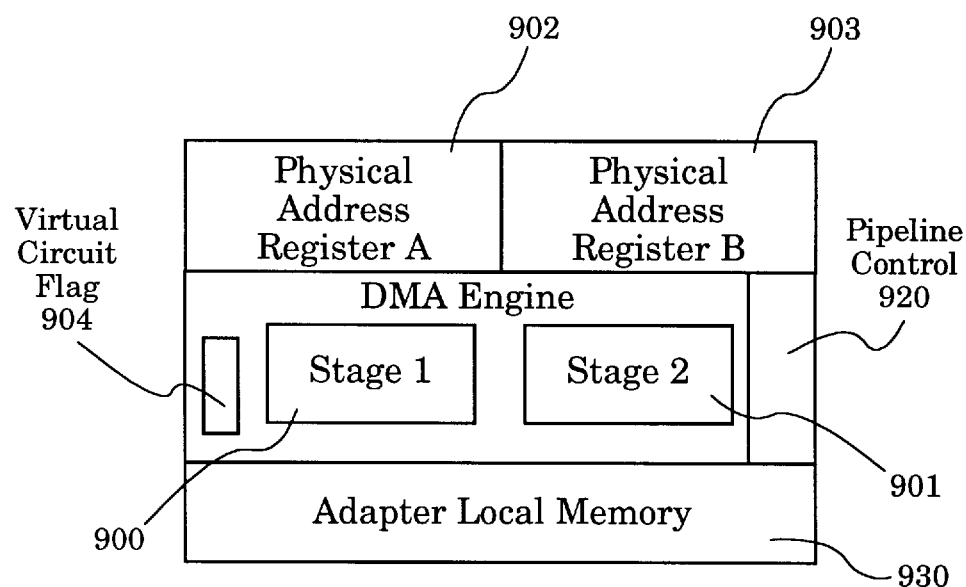
FIG. 9a illustrates an embodiment of an adapter which performs pipelined operations and FIG. 9b illustrates one embodiment of the pipeline operation of the virtual register access and direct memory access.
Figure 9B:
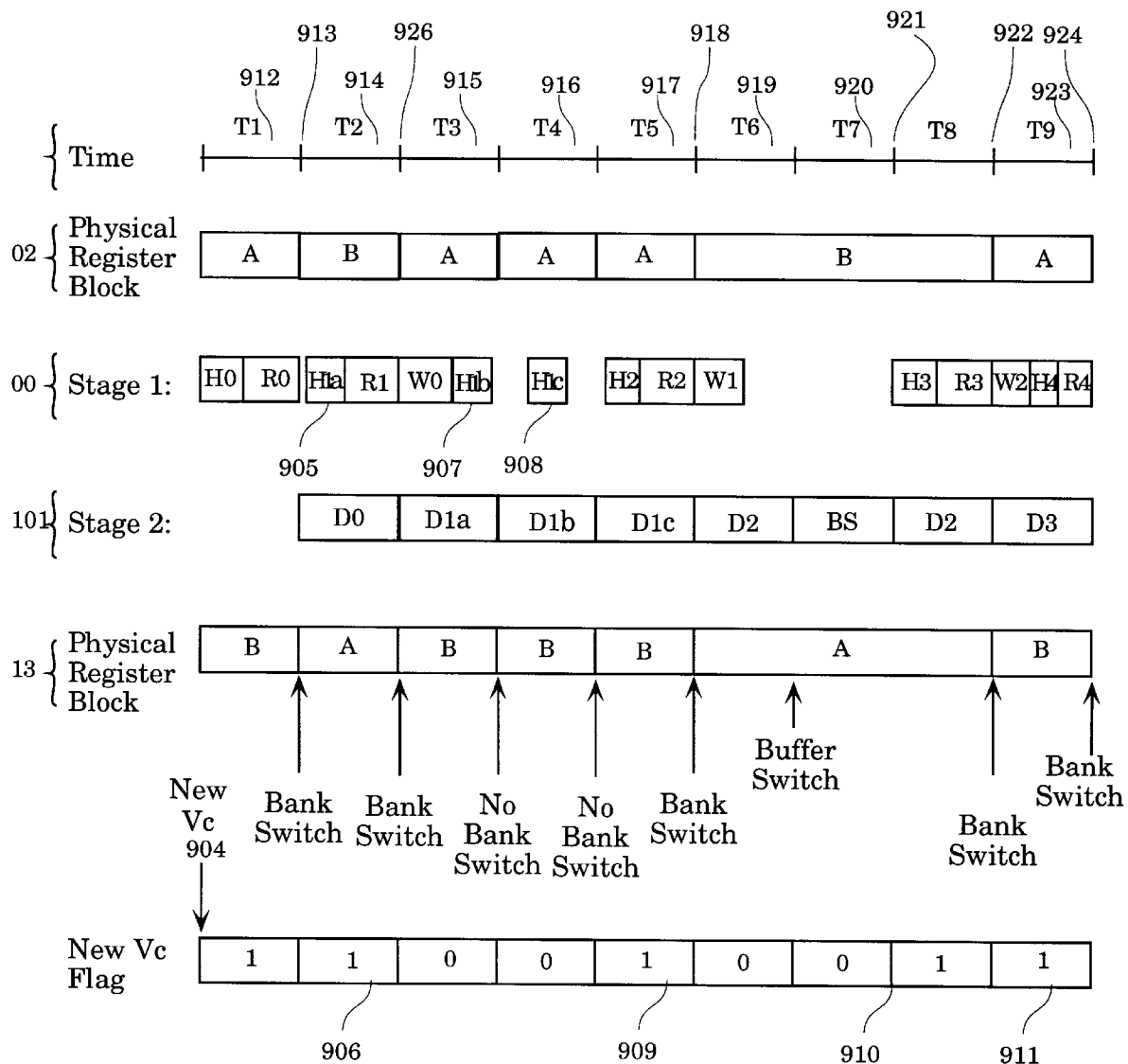

In an additional aspect of the system of the present invention, pipelining is performed in order to achieve the high throughput needed to achieve high data rates without the need for large amounts of memory. FIG. 9a illustrates an exemplary adapter which performs pipelining. FIG. 9b is an exemplary illustration of the pipelining of the DMA and the virtual register access by the DMA engine. The DMA engine comprises two physical register blocks 902 and 903 and two pipeline stages 900, 901. The adapter also includes pipeline control circuitry which may be embodied in the DMA engine or a separate control element.

Stage 1 900 of the pipeline performs virtual register access from the adapter local memory 930 for the next set of data while stage 2 901 performs the DMA transfers for the current set of data. For example, during time period T1 912, the two physical register blocks, physical register block A 902 and physical register block B 903, utilized by stage 1 900 and stage 2 901, respectively. Thus, during time period T1 912, the physical register block A 902 is used to store the virtual register read by the virtual register access stage, stage 1 900. Also during time period T1 912, the physical register block B is idle since its corresponding stage, stage 2 901 is idle as well. At the end of time period T1 913 physical register block A 902 and physical register block B 903 are switched so that physical register block B 903 is associated with stage 1 900, while physical registers block A 902 is associated with stage 2 901.

The example set forth in FIG. 9 illustrates an example when the pipeline is initially empty and data for virtual circuit #0 arrives during time T1 912. The arrival of data on virtual circuit #0 initiates a stage 1 900 process that sets a new virtual circuit flag 904 and reads the corresponding virtual register into physical register block A 902. The new virtual circuit flag 904 triggers a physical register block switch at the end of time period T1 913 so that physical register block A 902 is associated with stage 2 901, while physical register block B 903 works with stage 1 900. Starting at time period T2 914, stage 1 900 and stage 2 901 operate in parallel. During time period T2 914, stage 2 901 DMA transfers the data received on virtual circuit #0 to the host memory and updates the information in physical register block A 903 regarding the virtual register assigned to virtual circuit #0 while stage 1 900 looks for a new cell. Arrival of cell 'a' 905 for virtual circuit #1, during time period T2 914, triggers the fetching of the virtual register in stage 1 900, and the new virtual circuit flag 906 is set.

At the end of time period T2 926, the physical register blocks are switched so that physical register block A works with stage 1 900 and physical register block B works with stage 2 901. DMA operation continues in stage 2 901 while stage 1 900 writes back the updated physical register block values for the virtual register assigned to virtual circuit #0 into the virtual register assigned to virtual circuit #0 and looks for the arrival of a new cell. When cells 'b' 907 and 'c' 908 arrive for virtual circuit #1 during time periods T3 915 and T4 916, no new virtual circuit flag is set because the cells originate from the same virtual circuit. Therefore, no physical register block switching occurs during the DMA transfer of cells 'b' and 'c'. Thus, the DMA operation continues uninterrupted as long as the arriving cell belong to the same virtual circuit. Stage 1 900 is practically idle during the time periods T3 915 and T4 916. However, when a cell from virtual circuit #2 arrives during time period T5 917, stage 1 900 sets a new virtual circuit flag 909 and reads the corresponding virtual register. At the end of time period T5 918, the physical register blocks are switched so that physical register block B works with stage 1 900 while physical register block A works with stage 2 901.

During time period T6 919, stage 1 900 writes back the updated physical register block values regarding the virtual register assigned to virtual circuit #1 into the virtual register assigned to virtual circuit #1 and looks for a new cell while stage 2 901 continues the DMA operation of the cell for virtual circuit #2. During the middle of memory access, that is, during time period T7 920, the current buffer for virtual circuit #2 becomes full. Stage 2 901 responds by writing the updated physical register block back into the virtual register and fetches a new virtual register that corresponds to the next free buffer. DMA operation resumes at the end of time period T7 921. Meanwhile, stage 1 900 continues to look for the arrival of the next cell. When cell arrives for virtual circuit #3, stage 1 900 sets the new virtual circuit flag 910 and fetches the virtual register for this virtual circuit. At time 922 physical register blocks are switched so that physical register block A works with stage 1 900 and physical register block B works with stage 2 901.

During time period T9 923, stage 2 901 continues using physical register block B while stage 1 900 writes back the updated physical register block values into the virtual register for virtual circuit #2 and looks for a cell. When a cell arrives for virtual circuit #4, during time period T9 923, stage 1 900 sets the new virtual circuit flag 911 and fetches the corresponding virtual register. At the end of T9 924, physical register blocks are switched. This process continues with no interruption in the DMA operation unless an end of buffer is reached in the middle of a cell transfer, as happened during time period T7 920, or there is no more data for DMA. The DMA engine also notifies the host device via the mailbox after completing the transfer to or from a buffer or at the end of the transfer of a PDU or frame.

The DMA mechanism used in the present invention is designed to be flexible in order to support a variety of data structures in memory. The DMA mechanism can support up to 64 thousand virtual circuits. The DMA engine will operate continuously, even when switching form one virtual circuit to another.

In order to begin the DMA transfer, the virtual register in the adapter local memory is copied into the physical register block in the DMA engine. The physical register block is initialized to correspond with the virtual register each time the DMA engine switches from one virtual circuit to the next. Once the virtual register is set up in the adapter local memory, then the DMA engine essentially operates independently of the host device. For instance, during the receive process, the DMA engine automatically loads the virtual register for the next free buffer after the current buffer is full, without involving the host device. Likewise, during transmission, the DMA engine loads the virtual register for the next buffer after completely transmitting the current buffer by traversing through a linked list of virtual registers previously set up by the host device.

This independent operation of the DMA engine during runtime enables the system to support high network data. For example, at a data rate of 622 Mbits/sec, the inter-cell arrival time is only approximately 700 ns and therefore the host device or other on-board processor is not able to load the DMA physical register block in real time. However, with the pipelined mechanism and the stand-alone operation of the DMA, a network data rate of 622 Mbits/sec is accommodated.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A system for transferring information on a network comprising:
    a host device coupled to a network;
    a first and second storage area; and
    a pipeline control having a first pipeline stage for retrieving a location of a buffer for a next transfer and storing the location of the buffer for the next transfer in the second storage area and a second pipeline stage for performing a DMA transfer using a buffer for a current transfer, the location of the buffer for the current transfer stored in the first storage area, said pipeline control switching the first and second storage areas such that host devices stores an identification of a buffer for a subsequent transfer in the first storage area.

2. The system of claim 1, wherein the network is an asynchronous transfer mode network.

3. The system of claim 1, wherein data is transferred from the host device to the network.

4. The system of claim 1, wherein data is transferred from the network to the host device.

5. The system as set forth in claim 1, wherein the host device further includes an adapter coupled to the network, the adapter including the first and second storage area and the pipeline control the first and second storage areas including a register that stores the location of a buffer for a transfer.

6. The system as set forth in claim 1, wherein the host device includes a host memory, and further wherein the host memory includes the first and second storage area.

7. The system of claim 5, wherein a virtual circuit identifies the host, and the register is assigned to the virtual circuit such that when information is transferred on the virtual circuit, the assigned register identifies the location of the buffer for the transfer.

8. The system as set forth in claim 7, wherein the adapter further comprises a register pointer table, said table comprising a virtual circuit identification for the virtual circuit and a pointer to the register.

9. The system as set forth in claim 8, wherein the first pipeline stage and second pipeline stage repeatedly switch between the first and second storage areas to perform additional information transfers.

10. The system as set forth in claim 9, wherein said adapter further comprises a virtual circuit flag, said flag set when a transfer to be performed is to be performed on a different virtual circuit than an immediate prior transfer, said pipeline control switching the first and second storage areas when the virtual circuit flag is set.

11. The system as claimed in claim 5, wherein said adapter further comprises a mailbox for the temporary storage of communications between the host device and the adapter regarding status information of the transfer of information, said host device and said adapter accessing the status information.

12. The system as set forth in claim 11, wherein the mailbox is stored in adapter local memory.

13. The system as set forth in claim 11, wherein said adapter further comprises a mailbox flag, which when set, notifies the host device that status information is located in the mailbox.

14. The system as set forth in claim 11, wherein said adapter sets an interrupt in the host to notify the host device that status information is located in the mailbox.

15. A method for a first device to receive information from a second device across a network via a path defined by one of at least one virtual circuit, said first device comprising a host memory and buffers located in said host memory, said first device coupled to an adapter comprising an adapter local memory and a direct memory access (DMA) engine, said method comprising the steps of:
    storing addresses of the buffers in at least one register, each register corresponding to one of said at least one virtual circuit;
    identifying a first register corresponding to a first virtual circuit path over which the information is received;
    transferring the address stored in said first register to a first storage area of the DMA engine of the adapter;
    initiating a DMA transfer wherein the received information is written to the buffer identified by the address stored in said first register;
    identifying a second register corresponding to a second virtual circuit path over which information is received and transferring the address stored in the second register to a second storage area of the DMA engine while the DMA engine performs a transfer to the buffer identified by the address stored in said first register; and performing a subsequent DMA transfer wherein the information received over the second virtual circuit is written to the buffer identified by the address stored in the second register while a resister corresponding to a virtual circuit other than the second virtual circuit is identified and the address stored in the register is transferred to the first storage area.

16. The method as set forth in claim 15, wherein said step of storing addresses of the buffers comprises the step of storing the addresses of the buffers in at least one register located in the adapter local memory.

17. The method as set forth in claim 15, wherein said step of storing addresses of the buffers comprises the step of storing the addresses of the buffers in at least one register located in the host memory.

18. The method as set forth in claim 16, wherein said step of storing addresses of the buffers further comprises the step of generating a register pointer table in the adapter local memory, said table comprising a virtual circuit identification for each virtual circuit and a pointer to a corresponding register; and further wherein said step of transferring the address comprising the steps of referencing the register pointer table using the circuit identification to access the register pointer, and referencing the corresponding register pointed to by the register pointer.

19. The method as set forth in claim 18, wherein each of said registers further comprises status information and the step of copying the buffer address further comprises copying the contents of the register into the first storage area in the DMA engine; said method further comprising the step of writing the virtual circuit identification in the first storage area in the DMA engine.

20. The method as set forth in claim 19, further comprising the step of writing the contents of the first storage area in the DMA engine back to the register identified by the virtual circuit identification stored in the register in the DMA engine when the DMA engine completes the DMA transfer of information to the buffer.

21. The method as set forth in claim 19, wherein when new information is to be received via a different virtual circuit, said method further comprising the steps of:

writing the contents of the first storage area in the DMA engine back to the register identified by the virtual circuit identification stored in the register in the DMA engine; and performing the steps of identifying a buffer address, transferring the identified buffer address and initiating a DMA transfer to receive the new information.

22. The method as set forth in claim 16, further comprising the step of notifying the first device of status of the receipt of data.

23. The method as set forth in claim 22, wherein the step of notifying comprises the steps of writing status information into adapter memory, setting a flag to indicate that status information is awaiting to be read by the first device, said first device polling the flag to determine when to read the adapter memory for status information.

24. The method as set forth in claim 22, wherein the step of notifying comprises the steps of writing status information into adapter memory, and setting an interrupt in the host to notify the host device that status information is to be read.

25. The method as set forth in claim 15, wherein information is transferred across the network in packed data units (PDUs) comprising a PDU header and PDU data, the step of initiating a DMA transfer comprises the step of each register identifying a header buffer of a size corresponding to the size of a PDU header, and a data buffer, said step of initiating a DMA transfer comprising the steps of:

transferring the PDU header into a header buffer; and when the header buffer is full, transferring the PDU data into the data buffer.

26. A method for transmitting data from a first device across a network to a second device, said first device comprising a host memory comprising at least one buffer, said method comprising the steps of:

coupling an adapter between the first device and the network, said adapter comprising an adapter memory and a direct memory access (DMA) engine;

said host writing the data to be transmitted into at least one buffer;

said host generating an identification of a first buffer containing data for a first transfer;

transferring the identification of the first buffer into a first storage area in the DMA engine;

said adapter performing a DMA access to retrieve data from the identified first buffer and transmit the data contained in the first buffer across the network;

said host generating an identification of a second buffer containing data for a second transfer and storing the identification of the second buffer in a second storage area in the DMA engine while the data contained in the first buffer is transmitted across the network; and switching the first and second storage areas such that the DMA engine transfers the data contained in the buffer identified in the second storage area while the host generates an identification of a buffer containing data for a subsequent transfer and stores the identification of the buffer in the first storage area.

27. The method as set forth in claim 26, said step of performing a DMA access further comprising the steps of retrieving a portion of data from the buffer during each access and transmitting the portion across the network, said step of retrieving a portion and transmitting the portion repeated until the contents of the buffer is transmitted.

28. The method as set forth in claim 26, further comprising the step of writing the identification of the first and second buffers into the adapter local memory.

29. The method as set forth in claim 26, further comprising the step of writing the identification of the first and second buffers into the host memory.

30. The method as set forth in claim 28, wherein data is transferred across the network via a path defined by one of at least one virtual circuit;

said step of writing an identification of the first and second buffers into the adapter local memory comprising the step of generating virtual registers, each of said virtual registers comprising a buffer address;

said method further comprising the step of generating a virtual register pointer table in the adapter local memory, said table comprising a virtual circuit identification for each virtual circuit and a pointer to a corresponding virtual register;

said step of transferring comprising the steps of:
referencing the virtual register pointer table using the virtual circuit identification to access the virtual register pointer;
referencing the corresponding virtual register pointed to by the virtual register pointer; and copying the buffer address from the virtual register to the first storage area comprising at least one register in the DMA engine.

31. The method as set forth in claim 30, wherein each of the virtual registers further comprises status information and the step of copying the buffer address further comprises copying the contents of the virtual register into the first storage area in the DMA engine; said method further comprising the step of writing the virtual circuit identification in the first storage area in the DMA engine.

32. The method as set forth in claim 31, further comprising the step of writing the contents of the first storage area in the DMA engine back to the virtual register identified by the virtual circuit identification stored in the DMA engine when the DMA engine completes the DMA transfer of data from the buffer.

33. The method as set forth in claim 30, wherein the host writes data to be transferred across a virtual circuit in a plurality of buffers, said step of generating virtual registers further comprises generating a link pointer to point to a next virtual register of a plurality of virtual registers, each of the plurality of virtual registers comprising a buffer address of a buffer containing data written to by the host.

34. The method as set forth in claim 31, wherein when additional data has been written into buffers for transfer across a different virtual circuit, said method further comprising the steps of:

writing the contents of the first storage area in the DMA engine back to the virtual register identified by the virtual circuit identification stored in the first storage area in the DMA engine;

performing the steps of writing an identification of the buffer, transferring the identified buffer address and performing a DMA access to transfer the additional data across the different virtual circuit.

35. The method as set forth in claim 26, further comprising the step of notifying the first device of the status of the transfer of data across the network.

36. The method as set forth in claim 35, wherein the step of notifying comprises the steps of writing status information into adapter memory, setting a flag to indicate that status information is awaiting to be read by the first device, said first device polling the flag to determine when the adapter memory is to be read for status information.

37. The method as set forth in claim 35, wherein the step of notifying comprises the steps of writing status information into adapter memory, and setting an interrupt in the host to notify the host device that status information is to be read.

38. In a computer network comprising a plurality of devices coupled via a network, a device comprising a memory comprising at least one buffer for storing data transferred across the network, an adapter coupled between a device and the network for increasing the efficiency of transfers of data across the network comprising:

at least one virtual register which identifies the location of the buffer in the device memory;

a direct memory access (DMA) engine comprising a first physical register block and a second physical register block, said device causing the information contained in the virtual register that identifies the location of the buffer for a current transfer to be copied into the second physical register block;

a first pipeline stage for copying the information contained in the virtual register identified for a next transfer into the first physical register block;

a second pipeline stage for performing a DMA transfer for the current transfer between the network and a buffer identified in the second physical register block; and a pipeline control for switching the first pipeline stage to copy information contained in the virtual register for a subsequent next transfer into the second physical register block, and switching the second pipeline stage to perform a DMA transfer for the next transfer between the network and a buffer identified in the first physical register block.

39. The adapter as set forth in claim 38, further comprising an adapter local memory, wherein the virtual register is stored in the adapter local memory.

40. The adapter as set forth in claim 38, wherein a virtual circuit identifies the transmitting device and receiving device of data, and the virtual register is assigned to a virtual circuit such that when data is transmitted on the virtual circuit, the assigned virtual register identifies the location of the buffer data is transferred to.

41. The adapter as set forth in claim 38, further comprising a virtual register pointer table, said table comprising a virtual circuit identification for each virtual circuit and a pointer to a corresponding virtual register.

42. The adapter as set forth in claim 41, wherein the first stage and second stage are repeatedly switched to perform additional data transfers.

43. The adapter as set forth in claim 38, further comprising a mailbox for the temporary storage of communications between the device and the adapter regarding status information of the transfer of data, said device and said adapter accessing the status information.

44. In a computer network comprising a plurality of devices coupled via a network, a device comprising a memory comprising at least one buffer for storing data transferred across the network, an adapter coupled between a device and the network for increasing the efficiency of transfers of data across the network, comprising:

means for identifying the location of a first and a second buffer in the device memory;

processing means for performing a current transfer of data directly between the first buffer in the device memory and the network;

first and second register means for storing the location of the first and second buffers in the device memory; and means for copying the location of the second buffer to the second register means when a subsequent transfer of data is to be performed between the second buffer and the network, said copying performed while the processing means performs the current transfer, said processing means accessing the second register means to perform the subsequent transfer of data, said means for copying further including means for switching the first and second register means such that a subsequent data transfer uses the buffer identified by the second register means while the identification of a buffer for a subsequent transfer is stored in the first register means.

45. In a computer network comprising a plurality of devices coupled via a network, wherein data is transferred over virtual circuits on the network, a device comprising a memory comprising at least one buffer for storing data transferred across the network, an adapter coupled between a device and the network for increasing the efficiency of transfers of data across the network comprising:

a virtual register for storing an address of the at least one buffer, each buffer and virtual register corresponding to a virtual circuit;

a first physical register;

a second physical register;

a first pipeline stage, said first pipeline stage copying the address of the buffer to the first physical register for a next virtual circuit over which data is to be transferred;

a second pipeline stage for performing a current transfer of data over a current virtual circuit, said second pipeline stage referencing a buffer address stored in the second physical register directly transferring data between the network and the buffer; and a control switch for switching the first physical register and the second physical register such that the first pipeline stage copies the address of the buffer to the second physical register for a subsequent next virtual circuit, and the second pipeline stage performs a transfer of data over the next virtual circuit, said second pipeline stage referencing a buffer address stored in the first physical register.

46. The adapter as set forth in claim 45, further comprising a virtual circuit flag, said flag set when a transfer to be performed is to be performed on a different virtual circuit than an immediate prior transfer, said pipeline control switching the first and second physical registers when the virtual circuit flag is set.

47. In a computer network comprising a plurality of devices coupled via a network, wherein data is transferred over virtual circuits on the network, a device comprising a memory comprising at least one buffer for storing data transferred across the network, said transfer of data performed by an adapter coupled between the device and the network, a method for transferring data comprising the steps of:

storing an address of the at least one buffer, each buffer corresponding to a virtual circuit;

providing a first physical register and a second physical register;

a first pipeline stage of the adapter copying the address of the buffer to the first physical register for a next virtual circuit over which data is to be transferred;

a second pipeline stage performing a current transfer of data over a current virtual circuit, said second pipeline stage referencing a buffer address stored in the second physical register directly transferring data between the network and the buffer; and switching the first physical register and the second physical register such that the first pipeline stage copies the address of the buffer to the second physical register for a subsequent next virtual circuit, and the second pipeline stage performs a transfer of data over the next virtual circuit, said second pipeline stage referencing a buffer address stored in the first physical register.

48. The method as set forth in claim 47, further comprising the step of setting a flag when the step of switching is to be performed, said step of setting performed when a transfer is to be performed on a different virtual circuit than the virtual circuit over which transfers are performed by the second pipeline stage.

49. The method as set forth in claim 47; wherein the step of switching is performed when a transfer is to be performed on a different virtual circuit than the virtual circuit over which transfers are performed by the second pipeline stage.

* * * * *